United States Patent [19]

Cameron et al.

[11] Patent Number: 5,569,806
[45] Date of Patent: Oct. 29, 1996

[54] OLEFIN ISOMERISATION PROCESS USING METALLIC CATALYSTS IMPREGNATED WITH ORGANIC SULPHUR-CONTAINING COMPOUNDS BEFORE LOADING INTO THE REACTOR

[75] Inventors: Charles Cameron, Paris, France; Jean-Luc Nocca, Houston, Tex.; Patrick Sarrazin, Rueil Malmaison; Alain Forestiere, Vernaison, both of France

[73] Assignee: Institut Francais Du Petrole, Rueil Malmaison, France

[21] Appl. No.: 282,470

[22] Filed: Jul. 29, 1994

[30] Foreign Application Priority Data

Jul. 30, 1993 [FR] France .................... 93 09528

[51] Int. Cl.$^6$ .................................... C07C 5/23
[52] U.S. Cl. .................... 585/668; 585/664; 585/671
[58] Field of Search .................... 585/668, 664, 585/671

[56] References Cited

U.S. PATENT DOCUMENTS 3,290,404 12/1966 Howman et al. .................... 260/683.2
3,531,545 9/1970 Garner et al. .................... 585/668
4,132,745 1/1979 Amigues et al. .................... 260/683.2
4,724,274 2/1988 Boitiaux et al. .................... 585/668

FOREIGN PATENT DOCUMENTS 2627104 8/1989 France .

*Primary Examiner*—Asok Pal
*Assistant Examiner*—Bekir L. Yildirim
*Attorney, Agent, or Firm*—Millen, White, Zelano & Branigan, P.C.

[57] ABSTRACT

The invention concerns a process for the isomerisation of less substituted olefins to more substituted external olefins and/or internal olefins in the absence of diolefins, in the presence of a palladium based catalyst deposited on a support. Before loading it into the reactor, said catalyst is treated with at least one sulphur-containing compound which is dissolved in a solvent then activated in a neutral or reducing atmosphere between 20° C. and 300° C., 1 and 50 bars and with a VVH of 50 to 600 h$^{-1}$. The catalyst, containing 0.05% to 10% by weight of sulphur, is brought into contact with the feedstock and hydrogen between 20° C. and 200° C., 1 and 50 bars, a VVH of 0.5 to 10 h$^{-1}$ and a H$_2$/olefin molar ratio of 0.01 to 1.

17 Claims, No Drawings

OLEFIN ISOMERISATION PROCESS USING METALLIC CATALYSTS IMPREGNATED WITH ORGANIC SULPHUR-CONTAINING COMPOUNDS BEFORE LOADING INTO THE REACTOR

The present invention concerns a process for the isomerisation of olefins, more precisely isomerisation of external olefins to internal olefins and/or isomerisation of less substituted olefins to more substituted external olefins, in liquid hydrocarbon cuts such as $C_4$, $C_5$, and $C_6$ cuts from steam cracking, catalytic cracking or oligomerisation from which the maximum amount of diolefin compounds which they may contain have been removed, for example by selective hydrogenation. It is occasionally advantageous to isomerise external olefins to internal olefins when they are of greater importance to downstream processes, for example alkylation or etherification units. Isomerisation examples are 4-methyl-1-pentene (less substituted olefin) to 2-methyl-1-pentene (more substituted external olefin) and 2-methyl-2-pentene (internal olefin) and isomerisation of 4-methyl-2-pentene (internal olefin) to 2-methyl-2-pentene (internal olefin) and 2-methyl-1-pentene.

These treatments are carried out using catalysts which are based on at least one group VIII metal deposited on an amorphous or crystalline support.

When the feedstock to be treated contains little or no diolefins, a further problem manifests itself. It is difficult to isomerise external olefins to internal olefins and/or internal olefins to other internal olefins in near-thermodynamic equilibrium mixtures and limit hydrogenation of the olefins to paraffins at the same time.

Selective hydrogenation of n-olefins can be controlled, for example by addition of sulphur to the feedstock as disclosed in U.S. Pat. No. 4,724,274.

This patent describes a process for the preparation of 2-methyl-2-butene (internal olefin) from a $C_5$ feedstock containing 2-methyl-1-butene (external olefin) and at least one n-pentene, using a catalyst which is based on a group VIII metal with a sulphur-containing compound present in the feedstock ($H_2S$, thiol, thiophene ...) at a concentration of 2 to 50 ppm. Linear olefins are selectively hydrogenated; in addition, 1-butene is isomerised to 2-butene. In the absence of sulphur in the feedstock, the isopentenes are also hydrogenated which reduces the yield of the products sought.

The object of the present invention is to further reduce hydrogenation and favour isomerisation by rendering the catalyst appropriately selective before loading it into the unit reactor.

More precisely, the present invention is a process for the isomerisation of external olefins contained in a feedstock of more substituted external olefins and/or internal olefins, said liquid feedstock being substantially free of diolefins, in the presence of a palladium based catalyst and in the presence of hydrogen, the isomerisation conditions of the process corresponding to a temperature of between 20° C. and 200° C., a pressure of between 1 and 50 bars, a VVH of between 0.5 and 10 $h^{-1}$ and an $H_2$/olefin molar ratio of between 0.01 and 1, wherein the catalyst is treated, before loading it into the isomerisation reactor, with at least one sulphur-containing compound dissolved in a solvent and in which the catalyst produced, containing 0.05% to 10% by weight of sulphur, is loaded into the reactor and activated at a temperature of between 20° C. and 300° C., a pressure of between 1 and 50 bars and a VVH of between 50 and 600 $h^{-1}$, and wherein the feedstock is brought into contact with said activated catalyst under isomerisation conditions.

We have discovered that, surprisingly, the introduction of organic sulphur-containing compounds improves the isomerising activity of the catalyst, despite intermediate handling in air. Without limiting the invention to these compounds alone, the compounds used can be sulphur-containing compounds, in particular organic sulphur-containing compounds which can decompose during catalyst activation treatment in the reactor. This activation is carried out in a neutral or reducing atmosphere at a temperature between 20° C. and 300° C., preferably between 60° C. and 210° C., a pressure of between 1 and 50 bars, preferably 3 to 20 bars, and a VVH of between 50 and 600 $h^{-1}$ preferably 100 to 200 $h^{-1}$ (VVH=hourly volume of feedstock in $m^3$ per $m^3$ of catalyst).

Particular organic sulphur compounds which can be used in the present invention are organic alkyl or aryl sulphides or organic alkylaryl or arylalkyl sulphides. Examples are butylethylsulphide, diallylsulphide, dibutylsulphide, dipropylsulphide, thiophene, dimethylthiophene and ethylthiophene.

More generally, the following may be used either separately or in combination: thiols (thioalcohols, mercaptans, thiophenols) with formula $R_1$—SH where $R_1$ is an organic radical, thioethers with formula $R_1$—S—$R_2$, where $R_1$ and $R_2$ may be identical or different, organic disulphides with formula $R_1$—S—S—$R_2$ and HO—$R_1$—S—S—$R_2$—OH type disulphides.

An organic sulphur-containing compound may also be selected from the group constituted by thiodiazoles, organic thioacids, thioamides, thioesters and thiophenols. Examples are thiobenzoic acid, thiocresols, 3,3-thiodipropionic acid, 2,3,6-trimethylthiophenol, methylthioglycollate, naphthalene 2-thiol, phenyl isothiocyanate, 2-phenyl thiophenol, thioacetamide, thiobenzamide, 2,6-dimethylthiophenol, 3,5-dimethylthiophenol, 2,2'-dinitrodiphenyldisulphide, 2,5-dithiobiurea, ethyl thioglycollate, 2-methoxy thiophenol, and 3-methoxy thiophenol.

The process of the invention may also be carried out in the presence of other types of sulphur-containing additives. Thus mercapto-alcohols with the following formula can be cited:

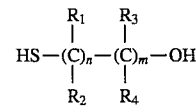

where n and m are whole numbers, $R_1$, $R_2$, $R_3$, $R_4$, which may be identical or different, are hydrogen atoms or alkyl, aryl, aralkyl etc. ... organic radicals with 1 to 20, preferably 1 to 6 carbon atoms per molecule; preferably, n=1–10 (1–2, for example) and m=1–10 (1, for example).

The following may also be cited: monothioglycols such as monothioethylene glycol, dithioglycols such as dithiopropylene glycol, dithiobenzenes such as dithioresorcin, heterocycles substituted with mercapto groups such as mercaptopyridine, mercaptopyrimidine etc. ... , dihydroxyalkyl sulphides such as thiodiethylene glycol ($S(CH_2CH_2OH)_2$), thiodipropylene glycol etc. ... , diaryl sulphides such as diphenyl sulphide, diaralkyl sulphides such as dibenzyl sulphide, cyclic thioethers and their substituted derivatives (ethylene sulphide, thiophene, thiazole, thiopyrone, thioxanthone, thioxanthhydrol, 1,4-thioxane etc. ... ) and S alkyl ethers of mercaptan substituted heterocycles (2-methylthio 4,6-diaminopyrimidine etc. ... ).

More particular examples of the above families of compounds are dimethylsulphoxide, ethylthiol ethanol, thioglycolic acid, dithioglycol and organic disulphides, particularly those with formula HO—R$_1$—S—S—R$_2$—OH as indicated above or HO—(CH$_2$)$_x$—S—(CH$_2$)$_{x'}$—S—(CH$_2$)$_{x''}$—OH where R$_1$ and R$_2$ are as defined above, and x, x', x", which may be identical or different, are whole numbers.

More particular examples are diethanol disulphide or 2,2-dithio bis-ethanol (DEODS) with formula HO—C$_2$H$_4$—S—S—C$_2$H$_4$—OH which is particularly soluble in water, glycols and polyglycols.

A polysulphide with formula R—S$_n$—R' may also be used, where n is a whole number between 3 and 20 atoms, preferably 4 to 8 and more particularly 5 to 7, R and R', which may be identical or different, represent organic radicals each containing 1 to 150 carbon atoms per molecule, preferably either 10 to 60 carbon atoms or 5 to 40 carbon atoms, more particularly 7 to 16, the radicals being selected from the group constituted by saturated or unsaturated, linear or branched or naphthene type alkyl radicals, aryl radicals, alkylaryl radicals and arylalkyl radicals. The various radicals contain at least one heteroatom. R' may also represent a hydrogen atom.

A preferred example of a polysulphide is ditertiododecylpolysulphide (n=5) where R and R' each represent a tertiododecyl radical.

This product is sold, for example, by ELF AQUITAINE under the trade name TPS 32 since it contains 32% by weight of sulphur. Ditertiononylpolysulphide (n=5) may also be cited, where R and R' each represent a tertiononyl radical.

The pretreatment agent is dissolved in a suitable solvent which depends on the nature of the sulphuration agent. The solvent selected may be one of the following solvents, used alone or as a mixture:

a light petrol, for example with a boiling point of between 60° C. and 95° C., a hexane type petrol with a boiling point of about 63° C. to 68° C., an F type petrol with a boiling point of between about 100° C. and 160° C. and generally containing 10% to 20% of aromatic hydrocarbons, for example 15% by volume, a "white spirit" type petrol with a boiling point of between 150° C. and 250° C. and generally containing 14% to 22% of aromatic hydrocarbons, for example 17% by volume, or any hydrocarbon or other cut which is equivalent to the above petrols.

The agent can be used in another solvent such as an alcohol (methanol, ethanol, propanol etc. . . . ), aldehyde, ketone, ether, ester, polyalcohol, acid, polyacid or glycol. These compounds may also act as a reducing agent. Water is a further possible solvent.

Following impregnation, the catalyst is advantageously thermally treated, generally between 100° C. and 200° C.

Advantageously, in accordance with the present invention the catalyst incorporates 0.05% to 10%, preferably 0.2% to 1% of sulphur, expressed as the weight of sulphur with respect to the mass of the catalyst.

In general, the catalyst contains 0.02% to 2% by weight, preferably 0.05% to 1% advantageously 0.05% to 0.5% of palladium.

The presulphurated catalyst thus obtained is then activated in the reactor before the feedstock is introduced. The isomerisation reaction takes place at a pressure of between 1 and 50 bars (preferably 5 to 30 bars), a temperature of between 20° C. and 200° C. (preferably 50° C. to 150° C.), a VVH of between 0.5 and 10 h$^{-1}$ (preferably 1 to 6 h$^{-1}$), the molar H$_2$/olefin ratio being between 0.01 and 1 (preferably 0.02 to 0.2).

A sulphur-containing compound (as hereinbefore defined) may be added to the feedstock.

The following examples illustrate the invention without limiting its scope.

EXAMPLE 1 (Comparative)

100 cm$^3$ of LD 265 catalyst sold by SOCIETE PROCATALYSE (catalyst A) containing 0.3% by weight of palladium supported on alumina was placed in a 3 cm diameter steel tube. This catalyst, which is currently used for selective hydrogenation of steam cracking or FCC cuts, was activated as follows:

Reduction in hydrogen at a flow rate of 30 l/h for 5 hours at 200° C.

The catalyst was then cooled in a current of hydrogen followed by purging of the apparatus with nitrogen.

The isomerising and hydrogenating activity of the catalyst was then measured using a hydrocarbon feedstock having a weight composition shown in Table 1. The feedstock was passed over the catalyst bed with the hydrogen in ascending flux mode under the conditions shown in Table 1.

The reactor effluents were analysed by vapour phase chromatography using a 50 m PONA capillary column. The results obtained are shown in the column headed "Example 1" in Table 1 below.

A further advantage of the invention lies in the fact that sulphuration can be carried out in specialised units which are dedicated to this reaction, avoiding sulphur contamination of the isomerisation reactor (and any downstream apparatus).

A further advantage is that the catalyst can be exposed to air before loading it into the reactor. This possibility greatly facilitates packaging and transport of the catalyst.

TABLE 1

|  | Feed | Ex 1 | Ex 2 | Ex 3 | Ex 4 | Ex 5 | Ex 6 |
| --- | --- | --- | --- | --- | --- | --- | --- |
| 4-methyl 1-pentene | 0.89 | 0.38 | 0.73 | 0.70 | 0.64 | 0.77 | 0.93 |
| Cis 4-methyl 2-pentene | 2.97 | 2.69 | 2.62 | 2.55 | 1.75 | 2.09 | 2.51 |
| Trans 4-methyl 2-pentene | 18.14 | 15.86 | 15.64 | 15.32 | 9.02 | 10.97 | 13.31 |
| 2-methyl 2-pentene | 42.00 | 42.59 | 43.38 | 43.69 | 45.05 | 44.51 | 43.96 |
| 2-methyl 1-pentene | 5.92 | 3.73 | 6.55 | 6.60 | 9.13 | 8.81 | 8.20 |
| 2-methylpentane | 0.08 | 4.73 | 1.05 | 1.08 | 4.32 | 2.80 | 1.63 |
| 2,2-dimethyl 1-butene | 1.37 | 1.79 | 1.62 | 1.58 | 1.16 | 1.31 | 1.48 |
| 2,3-demethyl 2-butene | 5.41 | 5.39 | 5.71 | 5.76 | 6.08 | 6.02 | 5.85 |
| 2,3-dimethylbutane | 0.04 | 0.24 | 0.06 | 0.06 | 0.14 | 0.10 | 0.07 |
| 1 & 3-hexenes (cis & trans) | 5.62 | 2.06 | 5.56 | 5.56 | 4.90 | 5.38 | 5.75 |
| Trans 2-hexene | 13.17 | 11.71 | 12.27 | 12.27 | 9.51 | 10.44 | 11.24 |

TABLE 1-continued

|  | Feed | Ex 1 | Ex 2 | Ex 3 | Ex 4 | Ex 5 | Ex 6 |
|---|---|---|---|---|---|---|---|
| Cis 2-hexene | 3.81 | 3.78 | 3.76 | 3.72 | 3.40 | 3.65 | 3.96 |
| Hexane | 0.00 | 5.05 | 1.06 | 1.11 | 4.89 | 3.14 | 1.71 |
| Sum of alkanes | 0.12 | 10.02 | 2.17 | 2.25 | 9.35 | 6.04 | 3.41 |
| Total undesired olefins (1) | 22.0 | 18.93 | 18.99 | 18.57 | 11.41 | 13.83 | 16.75 |
| Total undesired products (2) | 22.12 | 28.95 | 21.16 | 20.82 | 20.76 | 19.87 | 20.16 |
| Total desired olefins (3) | 47.92 | 46.32 | 49.93 | 50.29 | 54.18 | 53.32 | 51.56 |
| Space velocity (h$^{-1}$) |  | 2 | 2 | 2 | 2 | 2 | 2 |
| P (bar) |  | 20 | 20 | 20 | 20 | 20 | 20 |
| T (°C.) |  | 70 | 70 | 70 | 120 | 120 | 120 |
| H$_2$/olefins molar ratio |  | 0.1 | 0.1 | 0.2 | 0.2 | 0.1 | 0.1 |
| DMDS (ppm)* | 0 | 0 | 0 | 0 | 0 | 0 | 200 |

(1) 4-methyl 1-pentene + 4-methyl 2-pentene (cis + trans)
(2) 4-methyl 1-pentene + 4-methyl 2-pentene (cis + trans) + alkanes
(3) 2-methyl 2-pentene + 2-methyl 1-pentene
*DMDS = dimethyldisulphide EXAMPLES 2 TO 6: (In Accordance with the Invention)

100 cm$^3$ of LD 265 catalyst from SOCIETE PROCATALYSE containing 0.3% by weight of palladium supported on alumina was used. This was dry impregnated with 2.2 mole per liter of an aqueous solution of formic acid and 0.15 mole per liter of diethoxydisulphide. The impregnated catalyst was dried for 6 hours at 120° C. This catalyst was termed catalyst B. It was placed in a 3 cm steel tube and activated as follows:

Reduction in hydrogen at a flow rate of 30 l/h for 5 hours at 200° C.

The catalyst was then cooled in a current of hydrogen followed by purging of the apparatus with nitrogen.

The isomerising and hydrogenating activity of the catalyst was then measured using a hydrocarbon feedstock having a weight composition shown in Table 1. The feedstock was passed over the catalyst bed with the hydrogen in ascending flux mode under the conditions shown in Table 1.

The reactor effluents were analysed by vapour phase chromatography using a 50 m PONA capillary column. The results obtained are shown in the columns headed "Example 2 to Example 6" in Table 1 of Example 1. It can clearly be seen that in accordance with the invention the quantity of 2-methyl-pentene type olefins (highly desirable olefins) is higher and the proportion of undesirable alkanes and olefins is reduced with respect to the results obtained for Example 1.

A further advantage of the invention lies in the fact that sulphuration can be carried out in specialised units which are dedicated to this reaction, avoiding sulphur contamination of the isomerisation reactor (and any downstream apparatus).

A further advantage is that the catalyst can be exposed to air before loading it into the reactor. This possibility greatly facilitates packaging and transport of the catalyst.

We claim:

1. A process for the isomerization of external olefins to produce internal olefins and more substituted external olefins, comprising subjecting to isomerization conditions in the presence of an activated catalyst a feedstock comprising external olefins, said liquid feedstock being substantially free of diolefins, in the presence of a palladium based catalyst and in the presence of hydrogen, the isomerization conditions of the precess corresponding to a temperature of between 20° C. and 200° C., a pressure of between 1 and 50 bars, a VVH of between 0.5 and 10 h$^{-1}$ and an H$_2$/olefin molar ratio of between 0.01 and 1, wherein the catalyst is treated, before loading into the isomerization reactor, with at least one sulfide or disulfide dissolved in a solvent, the catalyst, which contains 0.05% to 10% by weight of sulfur is loaded into the reactor and activated in a neutral or reducing atmosphere at a temperature of between 20° C. and 300° C., a pressure of between 1 and 50 bars and a VVH of between 50 and 600 h$^{-1}$.

2. Process according to claim 1, characterised in that the feedstock is selected from the group formed by C$_5$, C$_6$ cuts from steam cracking, catalytic cracking and oligomerisation, said cuts being practically free of diolefins.

3. Process according to claim 1, characterised in that the catalyst is constituted by palladium deposited on alumina.

4. Process according to claim 1, characterised in that the sulphur-containing compound is selected from the group constituted by organic alkyl or aryl sulphides, organic alkylaryl or arylalkyl sulphides, thiols, thiodiazoles, organic thioacids, thioamides, thioesters, thiophenols, mercapto-alcohols, and monothioglycols.

5. Process according to claim 1, characterised in that the solvent is selected from the group formed by petrols and hydrocarbon cuts.

6. Process according to claim 1, characterised in that the solvent is selected from the group formed by alcohols, aldehydes, ketones, ethers, esters, polyalcohols, acids, polyacids and glycols.

7. Process according to claim 1, characterised in that the solvent is water.

8. Process according to claim 1, characterised in that activation is carried out between 60° C. and 210° C., at a pressure of 3 to 20 bars and a VVH of 100 to 200 h$^{-1}$.

9. Process according to claim 1, characterised in that isomerisation is carried out between 50° C. and 150° C., at a pressure of 5 to 30 bars, a VVH of 1 to 6 h$^{-1}$ and an H$_2$/olefin molar ratio of 0.02 to 0.2.

10. Process according to claim 1, characterised in that a sulphur-containing compound is also introduced into the feedstock.

11. Process according to claim 1, characterised in that the catalyst contains 0.2% to 1% by weight of sulphur.

12. Process according to claim 1, characterised in that the catalyst contains 0.02% to 2% by weight of palladium.

13. Process according to claim 1, characterised in that the catalyst contains 0.05% to 1% by weight of palladium.

14. Process according to claim 1, characterised in that the catalyst contains 0.05% to 0.5% by weight of palladium.

15. A process for the isomerization of internal olefins to product more substituted external and internal olefins, comprising subjecting to isomerization conditions in the presence of an activated catalyst a feedstock comprising internal olefins, said liquid feedstock being substantially free of diolefins, in the presence of a palladium based catalyst and in the presence of hydrogen, the isomerization conditions of the precess corresponding to a temperature of between 20° C. and 200° C., a pressure of between 1 and 50 bars, a VVH of between 0.5 and 10 $h^{-1}$ and an $H_2$/olefin molar ratio of between 0.01 and 1, wherein the catalyst is treated, before loading into the isomerization reactor, with at least one sulfide or disulfide dissolved in a solvent, the catalyst which contains 0.05% to 10% by weight of sulfur is loaded into the reactor and activated in a neutral or reducing atmosphere at a temperature of between 20° C. and 300° C., a pressure of between 1 and 50 bars and a VVH of between 50 and 600 $h^{-1}$.

16. A process according to claim 1, with the proviso that the sulfide or disulfide is not a polysulfide with 3 or more sulfur atoms.

17. A process according to claim 15, with the proviso that the sulfide or disulfide is not a polysulfide with 3 or more sulfur atoms.

* * * * *